United States Patent
Fernandez

[15] 3,644,997
[45] Feb. 29, 1972

[54] DENTURE DEVICE WITH A SUCTION DIAPHRAGM

[72] Inventor: Jose de Jesus Fernandez, 430 N.E. 29th, Miami, Fla. 33160

[22] Filed: Mar. 29, 1971

[21] Appl. No.: 129,029

[52] U.S. Cl. ................................................................32/3
[51] Int. Cl. ..........................................................A61c 13/24
[58] Field of Search ....................................................32/2, 3

[56] References Cited

UNITED STATES PATENTS 2,165,558  7/1939  Linchitz..........................................32/3
3,409,985  11/1968  Graceffo..........................................32/3

Primary Examiner—Robert Peshock
Attorney—John Cyril Malloy

[57] ABSTRACT

This invention pertains to a dental plate providing an enlarged aperture through the molded structural material thereof and a flexible diaphragm, molded into said material, in enclosing relation to the hole. Lever means are provided which is operable, after the dental plate is properly seated in the mouth to, first, expel the air between the dental plate structure and the gingival tissues of the mouth and, second, to selectively create a comfortable degree of partial vacuum between the dental plate and the gingival tissues to hold the dental plate firmly in place. Detent means are provided to lock the lever means in any of a plurality of positions.

7 Claims, 5 Drawing Figures

Patented Feb. 29, 1972

3,644,997

INVENTOR
JOSE DE JESUS FERNANDEZ
BY John Cyril Malloy
ATTORNEY.

DENTURE DEVICE WITH A SUCTION DIAPHRAGM

STATE OF THE PRIOR ART

Various structures have been provided to increase the suction action to maintain a dental plate firmly in place in the mouth of the wearer such as the suction cups of soft rubber which are embedded in the roof portion of a dental plate as disclosed in U.S. Pat. No. 1,352,614, to J. Lehner.

In U.S. Pat. No. 1,696,110, to O. Dobele, a device is employed which provides a flexible membrane having a small perforation therein which communicates between the mouth of the wearer and a cavity in the upper surface of the roof of the dental plate. In this device, the wearer forces his tongue against the diaphragm and withdraws it to pull a partial vacuum in the cavity, thereafter the inherent flexibility of the membrane is depended upon to close the perforation to maintain the partial vacuum.

In the U.S. Pat. No. 2,165,558, to S. E. Linchitz and No. 2,510,184, to S. E. Lynn, small pressure actuated valves are provided, either within one or more teeth or as a replacement for one or more teeth, which pull a partial vacuum on very small areas of the gingival tissues through small bores in communication therewith.

U.S. Pat. No. 3,409,985, to J. A. Graceffo discloses an enlarged cover membrane in the roof of an upper plate which provides a plurality of very small openings therethrough communicating between the palate and a check valve opening through the roof of the dental plate. The check valve is operable to dispel air and saliva, upon the application of upward pressure to the dental plate, to create a partial vacuum between the plate and the palate. When it is desirable to increase the degree of partial vacuum, the tongue is pressed against the valve and withdrawn to, first, apply upward pressure and open the valve and to, second, close the valve and increase the degree of partial vacuum. The same patent discloses a similar valve structure for a lower dental plate which is operable by the application of pressure to some of the teeth to create a partial vacuum over a relatively small area of the lower gingival tissues.

BACKGROUND OF THE PRESENT INVENTION

The instant invention provides an upper dental plate with an enlarged opening through the roof portion which is completely enclosed by a flexible diaphragm. A lever means is operably connected to the diaphragm to selectively flex said diaphragm in an upward or downward direction. The dental plate is inserted in the mouth in the conventional manner and the lever means is operable in a first direction, exteriorly of the dental plate, to expel the air between the upper surface of the roof of the plate and the palate of the wearer, and then in a second direction, to create the desired degree of partial vacuum to hold the dental plate firmly in place.

A detent means is provided to cooperate with the lever means to hold said lever means in a selected position to maintain the desired degree of partial vacuum. In this manner the partial vacuum is evenly created over a wide area of the palate and the degree of partial vacuum is controllable at all times when the denture is in place in the mouth.

Most of the dental plates previously designed to create partial vacuums either apply the vacuum over a very small area of the gingival tissues, which is often dangerous with a possibility of resultant serious complications, or provide no positive control by which the degree of vacuum can be increased or decreased at will and then set or locked to maintain the selected degree of partial vacuum.

While the device of the instant invention is illustrated and described relative to an upper dental plate, it is also applicable to a lower dental plate.

DETAILED DESCRIPTION OF THE DRAWINGS

Figure 1:
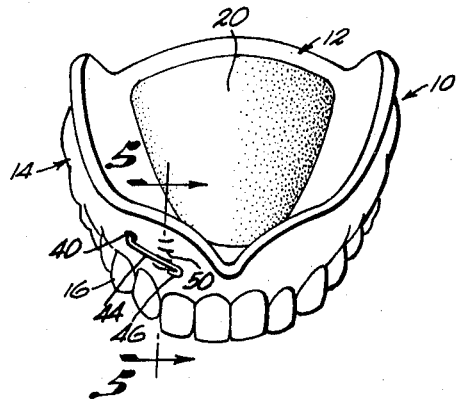
FIG. 1 is a top perspective view of a dental plate incorporating the present invention.

In the drawings in which like reference numerals designate like or similar elements throughout the various views, the numeral 10 generally designates an upper dental plate which is formed of a plastic material in the conventional manner.

The denture 10 includes a palate plate 12 and a gum portion 14 which carries the false teeth 16 in the conventional manner. As best illustrated in FIGS. 2 and 3, the palate plate 12 is provided with an enlarged, generally triangular shaped aperture 18 therethrough and a flexible diaphragm 20, molded into the palate portion 12, which completely closes said aperture 18.

Figure 4:
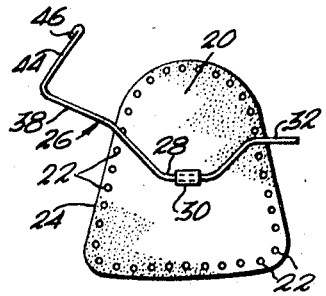
FIG. 4 is a bottom plan view of the diaphragm and lever means of the present invention, removed from the dental plate.

As illustrated in FIG. 4, the diaphragm 20 is of an enlarged, like configuration relative to the aperture 18 and preferably provides a plurality of peripherally disposed perforations 22 closely adjacent the peripheral edge 24 of the diaphragm. The flexible diaphragm may be formed from plastic, rubber or various other compositions which would provide the desired degree of body and flexibility and the perforations 22 provide the means to lock the diaphragm in the structural material of the dental plate during the molding operation. Serrated or notched edges may likewise be employed for this purpose.

Figure 2:
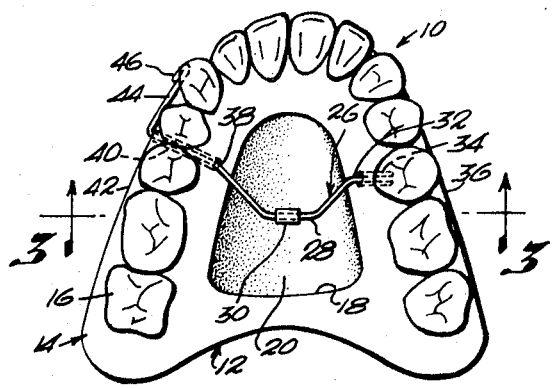
FIG. 2 is a bottom plan view of the dental plate of FIG. 1.
Figure 3:
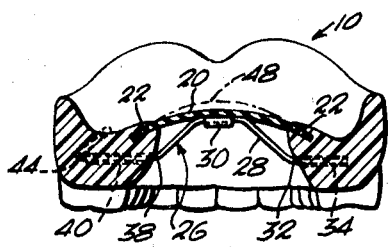
FIG. 3 is a cross-sectional view taken along the line 3—3 of FIG. 2.

As best illustrated in FIGS. 2, 3 and 4, a compound lever means 26 is provided which provides a generally U-shaped lever portion 28, the central portion of which is rotatably journaled in a downward tubular projection 30 on the underside of the diaphragm 20. This projection 30 may be formed integral with and of the same material as the diaphragm. One arm 32 of the compound lever 26 extends outwardly from the U-shaped lever portion 28 and is rotatably journaled in a suitable socket 34 in one side 36 of the gum portion 14, and the other arm 38 extends outwardly from the U-shaped lever portion 28, in a generally opposed direction through an aperture 40 in the other side 42 of the gum portion 14. Outwardly of the side 42, the compound lever 26 terminates in a generally forwardly extending actuating lever 44. The distal end 46 of the actuating lever preferably is looped or turned back upon itself.

As best illustrated in FIGS. 2 and 4 the U-shaped lever portion 28 and the actuating lever 44 of the compound lever means 26, as previously described, extend outwardly from the arms 32 and 38 in generally opposed directions whereby downward pivotal movement of the actuating lever 44 transmits an upward pivotal movement to the U-shaped lever portion 28 and the diaphragm 20, as illustrated in FIG. 3 by the broken line 48, is expanded upwardly. Upward pivotal movement of the actuating lever 44 transmits downward movement to the diaphragm 20.

In use, the dental plate of the present invention is inserted in the mouth and seated in the conventional manner. The actuating lever 44 is then pivoted downwardly to expand the diaphragm 20 upwardly to expel the air and excess saliva, between the top surface of the dental plate and the palate of the wearer, over a substantial area. Then the lever 44 is pivoted upwardly to transmit downward movement to the diaphragm 20, by reason of the pivotal connection between the U-shaped lever portion 28 and the projection 30, to create a partial vacuum between the top surface of the dental plate and the palate.

Figure 5:
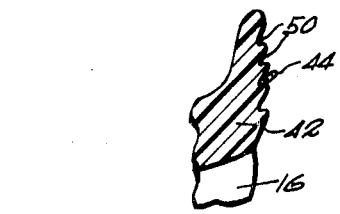
FIG. 5 is a fragmentary vertical sectional view taken along the line 5—5 on FIG. 1.

The amount of upward movement positively controls the degree of vacuum created therebetween and a comfortable adjustment can therefore be made by the wearer. As illustrated in FIGS. 1 and 5, a plurality of detent notches 50 are provided in the side 42 of the gum portion 14, adjacent the front thereof, which are positioned to be selectively engaged by the actuating lever 44 to maintain the desired degree of partial vacuum.

While a preferred form of the present invention has been illustrated and described, it will be obvious to those skilled in the art that various modifications and changes can be made therein without departing from the true spirit of the invention as defined in the appended claims.

What is claimed is:

1. A dental plate comprising
 A. a palate plate providing
  1. an enlarged through aperture;
 B. a flexible diaphragm enclosing said aperture;
 C. a pivotal compound lever means providing
  1. a first lever means pivotally connected to said flexible diaphragm,
  2. a second lever means operable to transmit pivotal movement to said first lever means to selectively expand and retract said diaphragm.

2. A dental plate as defined in claim 1 in which said flexible diaphragm is integrally molded in said palate plate.

3. A dental plate as defined in claim 2 including a plurality of peripherally disposed perforations adjacent the periphery of said flexible diaphragm.

4. A dental plate as defined in claim 1 in which said compound lever means is pivotally journaled in the dental plate and said first lever means comprises a generally U-shaped, generally rearwardly extending lever portion thereof.

5. A dental plate as defined in claim 4 in which said flexible diaphragm includes a downwardly extending tubular extension and said U-shaped lever is rotatably journaled in said tubular extension.

6. A dental plate as defined in claim 1 in which said second lever means extends generally forwardly, and exteriorly of said dental plate when said dental plate is seated in the mouth of a wearer.

7. A dental plate as defined in claim 6 including a plurality of detent notches in the dental plate which are positioned to be selectively engaged by said second lever means.

* * * * *